W. T. PARKIN.
TEA AND COFFEE STRAINER.
APPLICATION FILED FEB. 1, 1913.
1,073,164.
Patented Sept. 16, 1913.
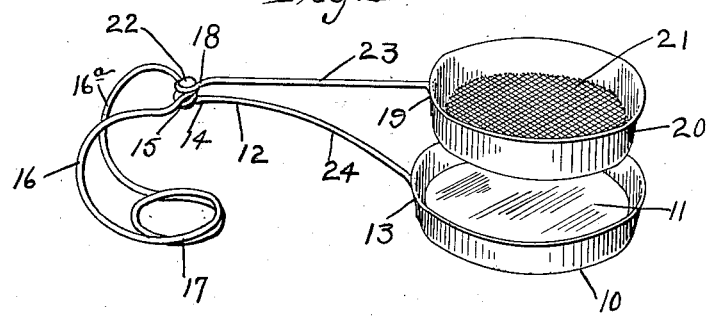
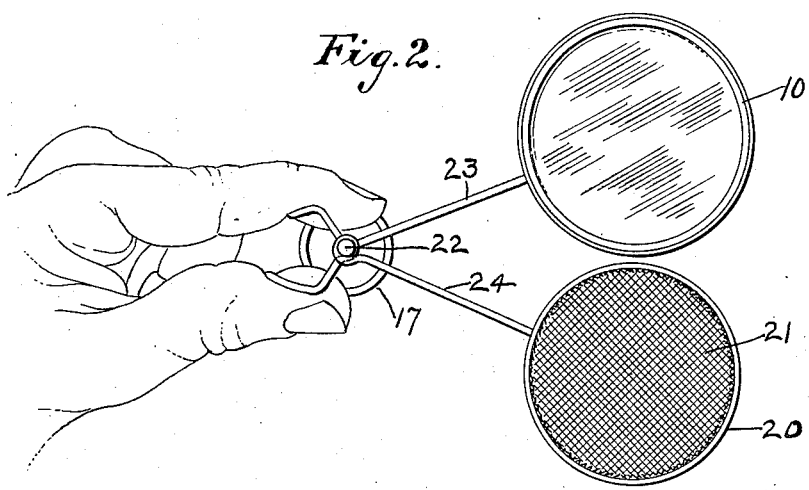
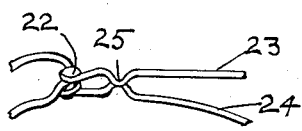
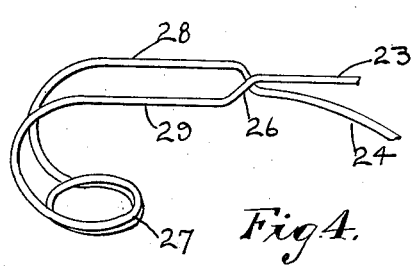
Witnesses
John F. Cavanagh
E. I. Ogden
Inventor
Winfred T. Parkin.
By
Howard E. Barlow
Attorney

UNITED STATES PATENT OFFICE.

WINFRED T. PARKIN, OF PROVIDENCE, RHODE ISLAND.

TEA AND COFFEE STRAINER.

1,073,164.  Specification of Letters Patent.  Patented Sept. 16, 1913.

Application filed February 1, 1913. Serial No. 745,542.

*To all whom it may concern:*

Be it known that I, WINFRED T. PARKIN, a citizen of the United States, and resident of the city of Providence, in the county of Providence and State of Rhode Island, have invented certain new and useful Improvements in Tea and Coffee Strainers, of which the following is a specification.

This invention relates to tea and coffee strainers of the class in which the strainer bowl is normally held above the drip cup and adapted to receive a relative lateral movement out beyond the edges of said cup, and is an improvement on my patent No. 989,403.

The object of this invention is to provide a device of this character in which the drip cup and the strainer bowl are provided with a handle constructed of resilient material, the same having two portions preferably hinged together at one point and then extending down and around into a spring loop, the downwardly extending portions being normally separated whereby when they are pressed toward each other the parts swing on the hinges and move the strainer and the cup apart on a horizontal plane one beyond the edge of the other.

A further object of the invention is to provide a stop to limit the return of the parts to normal.

With these and other objects in view, the invention consists of certain novel features of construction, as will be more fully described and particularly pointed out in the appended claims.

Of the accompanying drawings: Figure 1— is a perspective view illustrating my improved tea and coffee strainer in normal position. Fig. 2— is a plan view illustrating the strainer bowl and drip cup as having received a relative lateral movement and in position to permit the liquid to be poured through the strainer. Fig. 3— illustrates the bending of the supporting arms of the handle toward each other for the purpose of forming a stop to control the normal relative position of the cup and strainer. Fig. 4— is a modification illustrating the supporting arms of the handle as crossing each other and doing away with a pivot, and then bent down into a spring coil to form a rest.

Referring to the drawings 10 designates the drip receiving cup which may be made in any desired shape and of any desired material, but I preferably form this cup somewhat shallow with a broad flat base 11 on which to rest. The handle 12 is constructed of suitable resilient material preferably of spring wire, one end of which is attached to the cup member at 13 and extends laterally therefrom and slightly upward from the plane of the base of the cup to the point 14 where a small coil 15 therein is formed. From here the wire has a portion 16 which extends back down and around into a larger coil 17, whose vertical axis is substantially in line with that of the upper loop or coil at 15. From this lower coil 17 the wire extends back at 16ª forming another small coil 18 just above the coil 15 in the first mentioned arm and then extends forward and its end 19 is connected to the strainer cup 20 to support the same above the drain cup, said strainer cup being provided with a fine wire mesh 21 through which the beverage to be poured may be strained.

A pivot 22 is passed through the small loop or coils 15 and 18 forming a hinge on which the arm portions 23 and 24 are adapted to swing.

The portions of the wire 16 and 16ª between the pivot 22 and the coil 17 are separated so as to provide a convenient handle to be gripped by the thumb and finger of the operator, as illustrated in Fig. 2, and when pressed toward each other swing on the pivot 20 to separate the arms 23 and 24 producing a relative lateral movement between the cup and strainer members, moving the strainer to the edge of the cup whereby the tea or coffee may be poured through the strainer into the drinking cup beneath and when released the spring of the coil 17 acting upon these arms immediately move the cup and strainer back into their relative normal position, the cup being under the strainer to receive any drippings which may drop therefrom, and the device may then be set upon the table until again called into action.

The coil portion of the handle serves a double purpose, first as a rest to support the weight of the handle and prevent the cup from upsetting; and second, it provides a spring whose action returns the parts to normal after having been separated by the pressure of the thumb and finger of the operator.

In some cases it is found advisable to provide a stop so that the parts after having been separated will return to a positively set position so as to insure alinement. In order to provide such a stop in some cases I bend either one or both of the arms 23 and 24, as at 25, whereby they will come in contact with or engage each other to form a stop to positively and properly position the strainer and locate one above the other.

The modification illustrated in Fig. 3 obviates the necessity of using the pivot 22 by crossing the arms 23 and 24 at the point 26, and in extending them down and around into a coil as at 27 whereby a pressure on the parts 28 and 29 will impart a relative lateral motion to the strainer and cup in opposite directions.

I claim:

1. A tea and coffee strainer comprising a drip cup having a supporting base, a strainer located in spaced relation in a plane above said cup, a laterally extending handle of resilient material having one end fixed to said cup and the other end to said strainer, the first-named part having a raised portion and the second-named part extending back adjacent said raised portion, said parts then separating and extending downward and around into a spring coil beneath said raised portion to form a rest, whereby when said portions are pressed toward each other they will produce a relative lateral movement of said cup and strainer.

2. A tea and coffee strainer comprising a drip cup having a supporting base, a strainer located in spaced relation in a plane above said cup, a handle of spring wire extending laterally from said cup having a portion raised and then bent downward substantially to the plane of the base of said cup and provided with a spring coil forming a rest, the wire then returning to the plane of the raised portion and then forward to engage and support said strainer, said parts being pivoted together at the raised portion, the downwardly extending portions being separated whereby when pressed toward each other they swing on said pivot to produce relative lateral movement of said cup and strainer.

3. A tea and coffee strainer comprising a drip cup member having a supporting base, a strainer member located in spaced relation in a plane above said cup, a laterally extending handle of spring wire having one end fixed to said cup and the other end to said strainer, the first-named part having a raised portion and the second-named part extending back and being pivoted on said raised portion, said parts then separating and extending downward and around into a spring coil beneath said pivot to form a rest, whereby when said latter portions are pressed toward each other they will swing on said pivot and produce a relative lateral movement of said members.

4. A tea and coffee strainer comprising a drip cup member having a supporting base, a strainer member located in spaced relation in a plane above said cup, a laterally extending handle of spring wire having one end fixed to said cup and the other end to said strainer, the first-named part having a raised portion and the second-named part extending back and being pivoted on said raised portion, said parts then separating and extending downward and around into a spring coil beneath said pivot to form a rest, whereby when said latter portions are pressed toward each other they will swing on said pivot and produce a relative lateral movement of said members, and a stop for limiting the return motion of the supporting parts of the handle to bring them normally into alinement with each other.

In testimony whereof I affix my signature in presence of two witnesses.

WINFRED T. PARKIN.

Witnesses:
HOWARD E. BARLOW,
E. I. OGDEN.

Copies of this patent may be obtained for five cents each, by addressing the "Commissioner of Patents, Washington, D. C."